United States Patent
Rosborough

(10) Patent No.: US 6,895,980 B2
(45) Date of Patent: May 24, 2005

(54) WHEEL SHIELD AND TIRE CLEANING APPARATUS

(76) Inventor: Payton Rosborough, 26306 Timberlane Dr. SE., Covington, WA (US) 98042-8403

( * ) Notice: Subject to any disclaimer, the term of this patent is extended or adjusted under 35 U.S.C. 154(b) by 372 days.

(21) Appl. No.: 10/195,160

(22) Filed: Jul. 16, 2002

(65) Prior Publication Data

US 2004/0011389 A1 Jan. 22, 2004

(51) Int. Cl.$^7$ .............................. B08B 13/00
(52) U.S. Cl. ................... 134/123; 134/183; 134/201
(58) Field of Search ................ 134/45, 123, 201, 134/172, 182, 183; 301/37.1, 37.42, 37.37; 15/257.01

(56) References Cited

U.S. PATENT DOCUMENTS

| | | | | |
|---|---|---|---|---|
| 2,975,447 A | * | 3/1961 | Vuchinas ................ | 15/53.4 |
| 3,854,448 A | * | 12/1974 | Kromanaker ............ | 118/505 |
| 4,784,440 A | | 11/1988 | Fair | |
| 4,811,991 A | * | 3/1989 | Moreno et al. ......... | 301/37.103 |
| 4,874,206 A | | 10/1989 | Sampson | |
| 5,435,630 A | | 7/1995 | Tucker | |
| 5,979,994 A | * | 11/1999 | Harmon ................. | 301/37.102 |
| 6,068,345 A | * | 5/2000 | Bressie ................. | 301/37.103 |
| 6,179,387 B1 | * | 1/2001 | Nasset et al. ......... | 301/137.102 |
| 6,227,623 B1 | * | 5/2001 | Bellow ................ | 301/37.42 |
| 6,425,639 B1 | * | 7/2002 | Getzelman ............ | 301/37.03 |
| 6,485,106 B1 | * | 11/2002 | Hermansen et al. ... | 301/37.103 |
| 6,672,677 B1 | * | 1/2004 | Smith ................. | 301/37.103 |
| 6,685,276 B2 | * | 2/2004 | Kenion ............... | 301/37.103 |
| 2003/0038528 A1 | * | 2/2003 | Kim ................... | 301/37.101 |
| 2003/0098607 A1 | * | 5/2003 | Crump ................ | 301/37.103 |
| 2003/0201666 A1 | * | 10/2003 | Artessa et al. ....... | 301/37.103 |

* cited by examiner

Primary Examiner—Frankie L. Stinson
(74) Attorney, Agent, or Firm—David L. Tingey

(57) ABSTRACT

A disc-shaped wheel cover, or shield, with an arm rotatable around the shield center includes a pressurized fluid container at the arm distal end filled with cleaning chemical, extending on the arm radially beyond the shield. A nozzle on the container directed axially disburses chemical toward a tire sidewall. Alternatively, the arm may comprise a grasping member on its distal end adapted to receive a commercially-available pressurized container. A wheel may also be mounted under the container to support the arm distal end a predetermined distance from the tire as the wheel rolls around the tire sidewall. The shield is removably attached to a wheel rim flange by an elastic skirt around the shield circumference at shield closed end with a skirt open end adapted to attach to the wheel. Thus, in operation the elastic skirt is stretched about the flange. A member less flexible than the elastic skirt, such as a bead or a relatively inflexible plastic or metal rod, may be provided around the skirt adapted to fit between the rim flange and the tire. Equivalently, the skirt may comprise a flexible sheet with an elastic ring at its open end, which also may comprise a bead, or generally less flexible member, or a plurality of arcuate rods circumferentially around the skirt open end, separating to spread over a flange and then contracting together again for engaging around the flange.

12 Claims, 5 Drawing Sheets

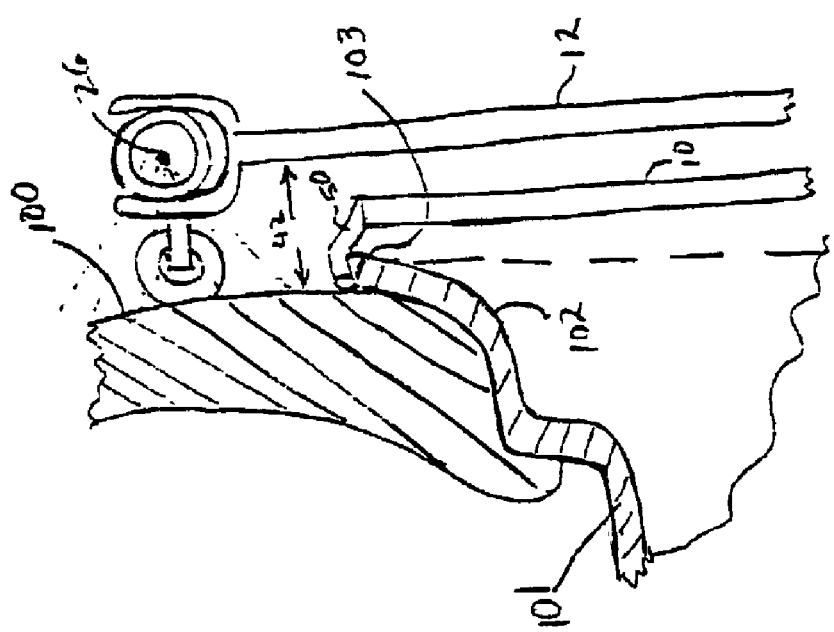

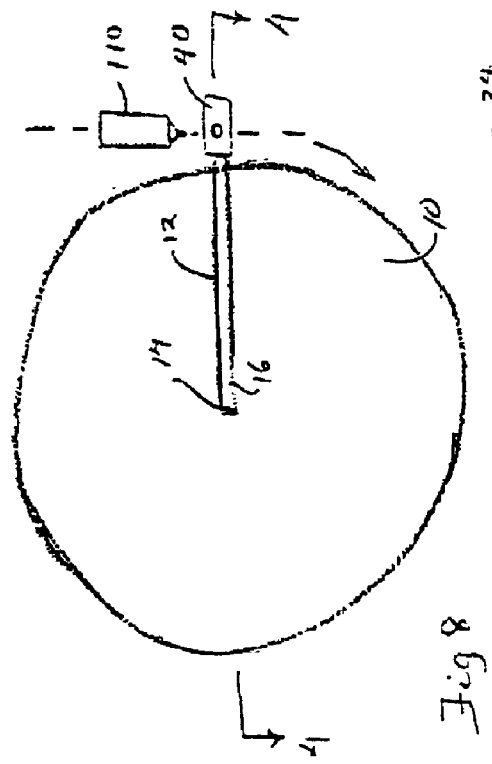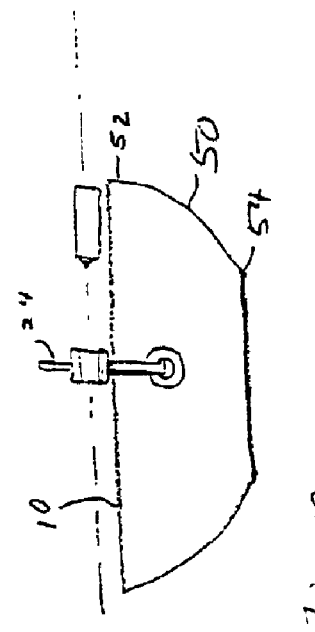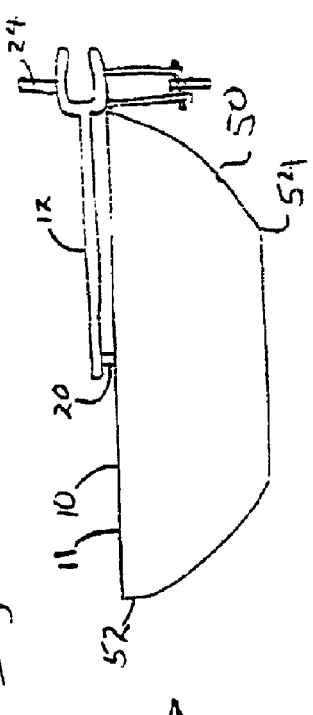

WHEEL SHIELD AND TIRE CLEANING APPARATUS

BACKGROUND

1. Field of the Invention

The apparatus of the present invention relates generally to circular shields removable mountable on wheel rims for protecting the wheel rims while tires mounted on the rims are being chemically treated or cleaned, and, more specifically, to a shield with a spray bottle in rotating disposition about the shield circumference through which cleaner is uniformly disbursed on the tire mounted on the rim.

2. Prior Art

Over spray from chemicals employed to clean and protect a tire sidewall can damage, dull or smear the rim on which the tire is mounted. Commonly, tires are mounted on fanciful rims, and their appearance is a concern to the owner. To avoid contact of the chemical with the rim, the chemical can be applied to the tire sidewall with a cloth but the more common and convenient application is to spray the chemical from its compressed container in which it is purchased. Users then seek to cover the rim while the chemical is sprayed.

There are several removable rim covers useful for this purpose. For example, U.S. Pat. No. 5,435,630 by Tucker discloses a protective cover that includes a body with a cylindrical side wall having a flexible lip that engages a flange on the wheel rim. U.S. Pat. No. 4,784,440 by Fair discloses a cover body also with a cylindrical side wall with a retainer depending axially from the side wall and inwardly to engage the rim flange. U.S. Pat. No. 4,874,206 by Sampson discloses a substantially flat cover with break-off rings that adapt the cover to different rim diameters with a rim-engaging apparatus on each ring.

Characteristically, after a wheel cover is removably mounted over the wheel, a user will direct a nozzle of a bottle of compressed chemical toward the tire and spray the chemical on the tire sidewall. Applying the chemical uniformly requires the user to move the bottle around the tire sidewall. To minimize chemical over spray from smearing the vehicle body paint, the bottle must be maintained a certain distance from the tire, not so close as to cause the chemical to drip and not cover the full sidewall and not so far as to permit spray from drifting onto the body paint, in both cases wasting the treating chemical and causing adverse results to the automobile. It is therefore desirable to have a chemical-disbursing bottle constrained the preferred distance from the tire while rotatable around the tire sidewall.

SUMMARY OF THE INVENTION

A disc-shaped wheel cover, or shield, is provided with an arm rotatable around the shield center. A pressurized fluid container is secured at the arm distal end, extending on the arm radially beyond the shield. The container is filled with cleaning chemical through a sealable orifice and pressurized by a hand pump on the arm. (For purposes of this description, reference to cleaning or cleaner chemicals is meant to include protectants and other similar chemicals useful for tire treatment). A nozzle on the container directed axially disburses chemical upon release toward the tire sidewall when the shield is mounted on the wheel. Alternatively, the arm may comprise a grasping member on its distal end adapted to receive a commercially-available pressurized container filled with a tire-treatment chemical. A wheel may also be mounted under the container to support the arm distal end a predetermined distance from the tire as the wheel rolls around the tire sidewall.

The shield is attached to the rim by a fastener, including any suitable manner previously known. Alternatively, it may be removably attached to a wheel rim flange by an elastic skirt attached around the circumference of the shield at a closed end and forming an open end adapted to attach to the wheel. Thus, in operation the elastic skirt is stretched about the flange. A member less flexible than the elastic skirt, such as a bead or a relatively inflexible plastic or metal rod, may be provided around the skirt adapted to fit between the rim flange and the tire. Equivalently, the fastener may comprise a skirt with a flexible sheet with an elastic ring at its open end, which also may comprise a bead, or generally less flexible member, of a plurality of arcuate rods separating to spread over a flange and then contracting together again for engaging around the flange.

BRIEF DESCRIPTION OF THE DRAWINGS

FIG. 4 is a top view of a grasping member with resilient fingers adapted to receive and secure a pressurized spray bottle.

FIG. 8 is a top view of the wheel shield with rotatable arm.

FIG. 9 is a side view of the wheel shield of FIG. 8.

FIG. 10 is an end view of the wheel shield of FIG. 8.

DETAILED DESCRIPTION OF THE PREFERRED EMBODIMENTS

Figure 1:
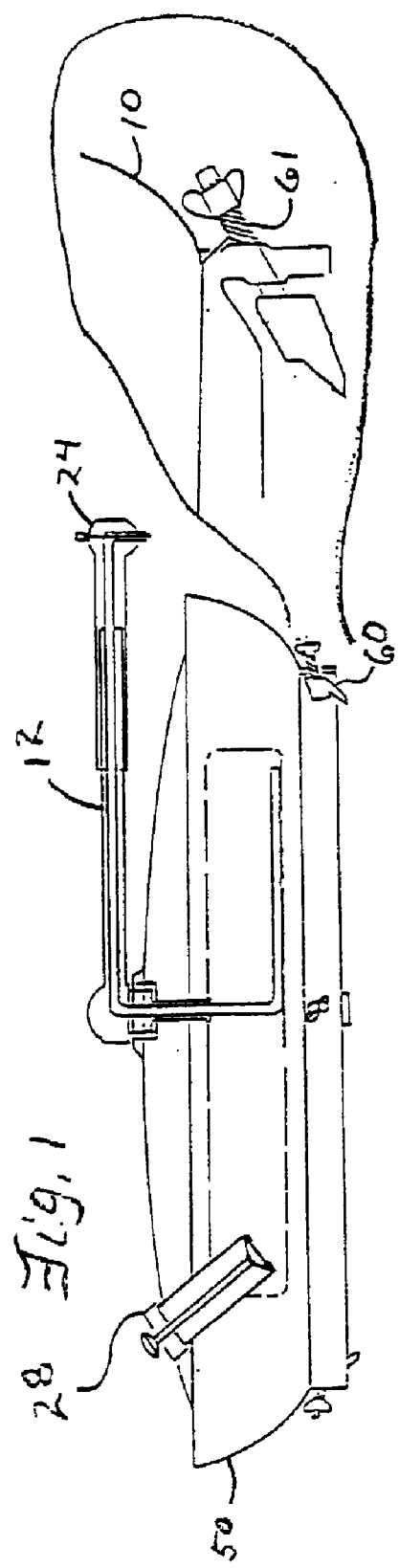
FIG. 1 is a cut-away view of the shield of FIG. 1.
Figure 2:
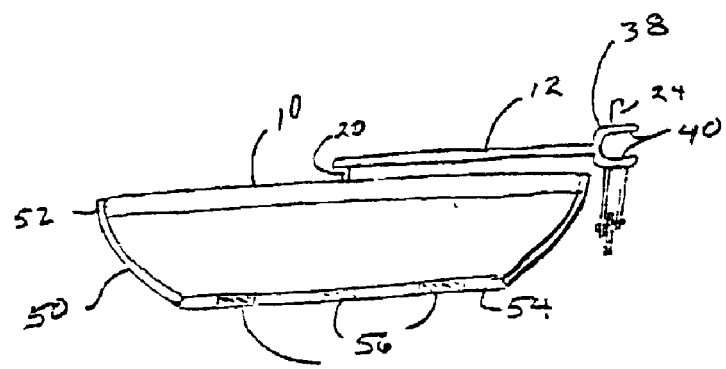
FIG. 2 is a cut-away side view of a flexible skirt with arcuate rods about its open end.
Figure 3:
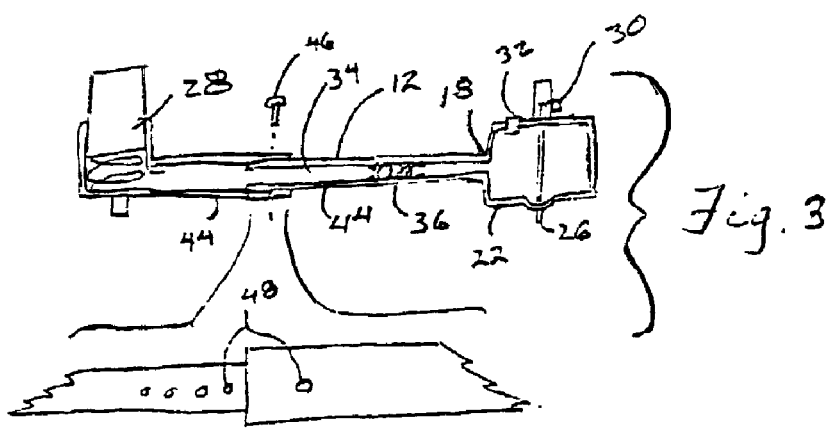
FIG. 3 is a cut-away side view of the wheel shield with rotatable arm.
Figure 7:
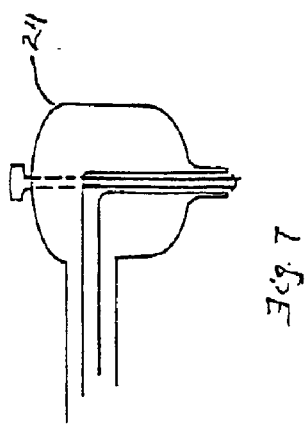
FIG. 7 is a cut-away view of the handle at the arm distal end, shown with a feeder tube which provides fluid communication between a fluid reservoir or bottle and a spray nozzle.
Figure 6:
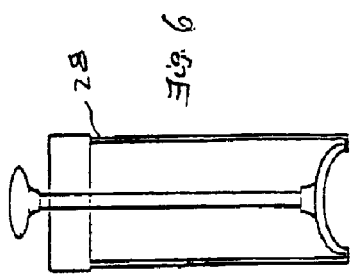
FIG. 6 is a cut-away side view of the pump that pressurizes the reservoir, or bottle.
Figure 5:
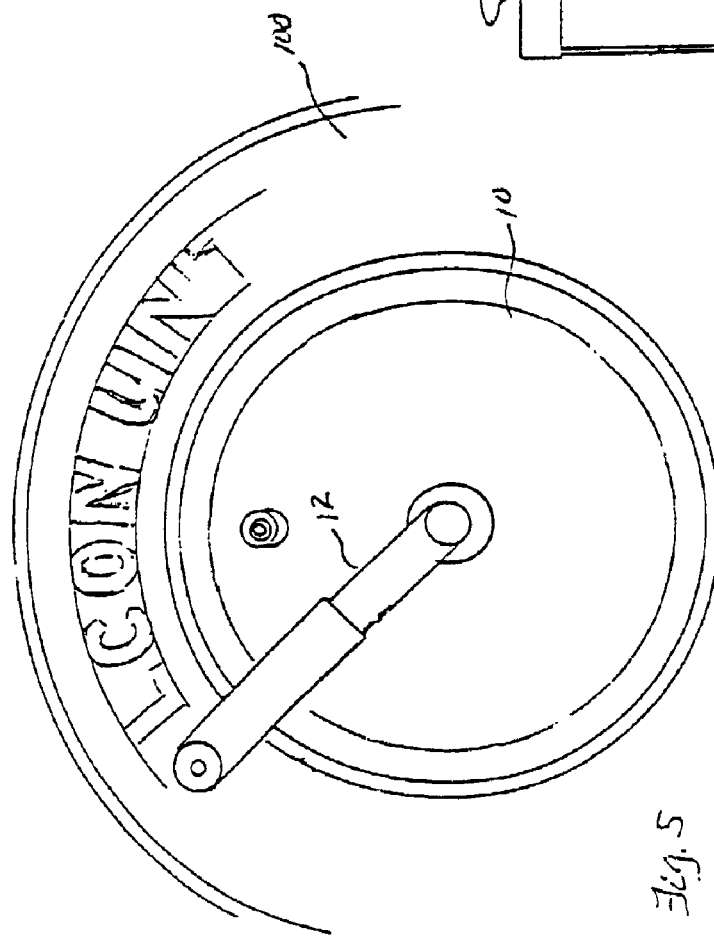
FIG. 5 is a perspective view of the shield mounted to a vehicle wheel.

The removable wheel cover, or shield, and tire cleaning apparatus 1 of the present invention comprises a circular, or disk-shaped, wheel shield 10 with a top 11 and an arm 12 pivotably mounted at the top center 14 so the arm rotates freely around the top.

The arm with an axis end 16 and an opposite distal end 18 is attached pivotably to the shield top center 14 at its axis end 16 on an axis pin 20 and is rotatable about the shield on that pin. A pressurized fluid chemical container, or bottle, 22 is provided at the arm distal end 18 at a position over a tire sidewall 100 when the shield is mounted to a wheel 101 on which the tire is mounted. The arm 12 further includes a handle 24 disposed to facilitate movement of the bottle around the circumference of the shield. The bottle includes a nozzle 26 directed axially for disbursing chemicals in the bottle toward the tire sidewall, a pneumatic pump 28 in fluid communication with the bottle by which the bottle with fluid within can be pressurized preparatory for release of the fluid through the nozzle, a switch mechanism 30 on the bottle and preferably on the handle for opening the nozzle, and a sealable orifice 32 on the bottle through which the bottle can be filled with fluid. Thus, as the pressurized bottle and the arm rotate around the shield, chemical spray from the bottle defines a uniform ring of disbursed cleaner about a shield perimeter.

The pump may be located integral with the container or, alternatively, at the shield center in which case the arm comprises a tube 34 providing fluid communication between the pump and the bottle. A flow valve 36 in the tube is then included allowing gas pressurized by the pump to flow through to the container but preventing cleaner from flowing from the bottle to the valve.

In an alternative embodiment, the fluid container includes a grasping member 38 on the arm distal end comprising two opposing resilient fingers 40 with a spring bias that flexes to receive and returns with spring action around a commercially-available pressurized bottle 110 of cleaning fluid within. The grasping member is disposed such that the spray head is directed toward the tire mounted on the wheel.

The container is positioned an operational distance 42 from the tire sidewall reasonably close to the tire to avoid over spray onto the vehicle body paint but also separated from the tire sufficiently to cover the tire sidewall uniformly and avoid dripping due to excessive spray.

To accommodate wheels of different size, the arm is length-adjustable by means of telescoping members 44 locked into a selected position by any appropriate means, such as a pin 46 through aligned holes 48 in the telescoping members or a spring-biased lug on a first telescoping member released into a selective one of a plurality of holes of a second telescoping member.

A flexible skirt 50 depends from the circumference of the circular shield top closing the skirt at its closed end 52. A skirt open end 54 is adapted to stretch over a wheel 101 having a rim 102 and a flange 103 on the rim as a fastener. The flexible skirt may be elastic to expand to different wheel diameters, stretchable over the rim flange to secure the shield on the wheel. The skirt may also or alternatively include a plurality of arcuate rods 54 less flexible than the elastic skirt around the skirt open end, separating to spread over a flange and then collapsing together again for engaging around the flange to secure the shield to the wheel by fitting between the rim flange and the tire. Similarly, the skirt may alternatively include an elastic band around the skirt open end to engage the flange. Alternatively, an anchor foot 60 may depend from the wheel shield 10 with an anchor foot screw 61 threaded through a hole in the anchor foot, disposed to engage a wheel rim 102 or flange 103 securing the wheel shield to the wheel rim as a fastener.

Having described the invention, what is claimed is as follows:

1. A wheel shield and tire cleaning apparatus comprising,
   a wheel shield including
      a circular top, and
      a fastener for attaching the shield to a wheel,
   an arm rotatable about a shield center to which the arm is pivotably attached at an arm axial end, and
   a cleaner disbursing apparatus at a rotating arm distal end extending radially beyond the shield such that as the cleaner disbursing apparatus and the arm rotate around the shield, the cleaner disbursing apparatus defines a uniform ring of disbursed cleaner about a shield perimeter.

2. The wheel shield and tire cleaning apparatus of claim 1 in which the fastener for attaching the shield to a wheel comprises an elastic ring depending around the perimeter of the shield stretchable over and contractable in secure engagement with a rim flange.

3. The wheel shield and tire cleaning apparatus of claim 1 in which the cleaner disbursing apparatus is positioned an operational distance from a tire mounted on the wheel when the wheel shield is mounted on a wheel such that the cleaner disbursing apparatus presents a uniform spray over a sidewall of the tire.

4. The wheel shield and tire cleaning apparatus of claim 3 in which the cleaner disbursing apparatus comprises
   a grasping member on the arm distal end for receiving a pressurized bottle of cleaner fluid with a spray head on the bottle, the grasping member disposed such that the spray head is directed toward the tire mounted on the wheel.

5. The wheel shield and tire cleaning apparatus of claim 4 in which the grasping member comprises a pair of opposing resilient fingers with a spring bias that flexes to receive a bottle within and returns with a spring action around the bottle to hold the bottle securely within the opposing resilient fingers.

6. The wheel shield and tire cleaning apparatus of claim 3 in which the cleaner disbursing apparatus comprises a bottle integral with the arm distal end,
   a spray head on the bottle through which fluid within may be sprayed,
   a switch mechanism on the bottle for opening the spray head for release of fluid within the bottle,
   an sealable orifice on the bottle through which the bottle can be filled with fluid,
   a pneumatic pump in fluid communication with the bottle by which the bottle with fluid within can be pressurized preparatory for release through the spray head with the spray head directed toward the tire mounted on the wheel.

7. The wheel shield and tire cleaning apparatus of claim 6 in which the pump is located at the shield center and in which the arm comprises a tube providing fluid communication between the pump and the bottle.

8. The wheel shield and tire cleaning apparatus of claim 7 further comprising a flow valve in the tube allowing gas pressurized by the pump to flow through to the bottle but preventing cleaner from flowing from the bottle to the valve.

9. The wheel shield and tire cleaning apparatus of claim 6 further comprising a handle on the bottle facilitating the manual rotation of the arm and bottle around the shield circumference.

10. The wheel shield and tire cleaning apparatus of claim 9 in which the switch mechanism is on the handle.

11. The wheel shield and tire cleaning apparatus of claim 1 in which the arm is length-adjustable, the arm further comprising first and second telescoping members having fastener apparatus therein to secure one within the other at a preferred relative position, or length adjustment.

12. The wheel shield and tire cleaning apparatus of claim 1 further comprising
   a fluid reservoir within the wheel shield in fluid communication with the cleaner disbursing apparatus, and
   a pump disposed to pressurize the fluid reservoir.

* * * * *